US010053072B2

(12) United States Patent
Lau et al.

(10) Patent No.: US 10,053,072 B2
(45) Date of Patent: Aug. 21, 2018

(54) MOTOR VEHICLE WITH MULTI-COLLISION BRAKE

(71) Applicant: VOLKSWAGEN AG, Wolfsburg (DE)

(72) Inventors: Matthias Lau, Wolfsburg (DE); Christian Alstadt, Braunschweig (DE)

(73) Assignee: Volkswagen AG (DE)

( * ) Notice: Subject to any disclaimer, the term of this patent is extended or adjusted under 35 U.S.C. 154(b) by 257 days.

(21) Appl. No.: 14/963,460

(22) Filed: Dec. 9, 2015

(65) Prior Publication Data

US 2016/0167633 A1    Jun. 16, 2016

(30) Foreign Application Priority Data

Dec. 16, 2014 (DE) .......... 10 2014 226 109

(51) Int. Cl.
| *B60T 8/1755* | (2006.01) |
| *B60T 8/171* | (2006.01) |
| *B60R 21/013* | (2006.01) |
| *B60T 7/04* | (2006.01) |
| *B60T 7/22* | (2006.01) |
| *B60L 3/00* | (2006.01) |
| *B60L 3/02* | (2006.01) |
| *B60L 15/20* | (2006.01) |
| *B60R 21/01* | (2006.01) |

(52) U.S. Cl.
CPC ........ *B60T 8/17558* (2013.01); *B60L 3/0007* (2013.01); *B60L 3/0084* (2013.01); *B60L 3/0092* (2013.01); *B60L 3/02* (2013.01); *B60L 15/2009* (2013.01); *B60R 21/013* (2013.01); *B60T 7/042* (2013.01); *B60T 7/22* (2013.01); *B60T 8/171* (2013.01); *B60R 2021/01259* (2013.01); *B60T 2201/024* (2013.01); *B60T 2270/604* (2013.01); *Y02T 10/645* (2013.01); *Y02T 10/72* (2013.01); *Y02T 10/7275* (2013.01); *Y02T 90/16* (2013.01)

(58) Field of Classification Search
None
See application file for complete search history.

(56) References Cited

U.S. PATENT DOCUMENTS

| 2002/0113488 A1* | 8/2002 | Harris ..................... B60T 7/042 |
| | | 303/113.1 |
| 2013/0103267 A1* | 4/2013 | DeWitt ..................... B60T 1/10 |
| | | 701/50 |

FOREIGN PATENT DOCUMENTS

| DE | 102004041672 A1 | 4/2005 |
| DE | 102008010528 A1 | 9/2008 |

(Continued)

*Primary Examiner* — Rami Khatib
*Assistant Examiner* — Gerrad A Foster
(74) *Attorney, Agent, or Firm* — Barnes & Thornburg LLP

(57) ABSTRACT

A method for triggering self-braking in a motor vehicle, in which following a first collision during an accident a self-braking request signal is transmitted to a brake controller by a collision sensor unit by a communications device of the motor vehicle. The multi-collision braking requested should be initiated in the event of damage to the brake controller that is caused by the first collision. The request signal is received by a control device of the motor vehicle that is disposed at a distance from the brake controller. The control device then determines whether the brake controller responds to the request signal. If no response of the brake controller is detected, the self-braking is initiated by the control device.

15 Claims, 2 Drawing Sheets

(56) References Cited

FOREIGN PATENT DOCUMENTS

| | | |
|---|---|---|
| DE | 102010055943 A1 | 8/2011 |
| DE | 102011005395 A1 | 12/2011 |
| DE | 102011108870 A1 | 4/2012 |
| DE | 102013002500 A1 | 8/2014 |
| EP | 1932735 A2 | 6/2008 |
| EP | 2423060 A1 | 2/2012 |
| EP | 2572953 A1 | 3/2013 |
| WO | 9849038 A1 | 11/1998 |
| WO | 2013149720 A1 | 10/2013 |

* cited by examiner

MOTOR VEHICLE WITH MULTI-COLLISION BRAKE

PRIORITY CLAIM

This patent application claims priority to German Patent Application No. 10 2014 226 109.0, filed 16 Dec. 2014, the disclosure of which is incorporated herein by reference in its entirety.

SUMMARY

Illustrative embodiments relate to a method for triggering self-braking in a motor vehicle during an accident. The self-braking is requested by a collision sensor unit by means of a request signal following a first collision. A brake controller should actually respond to the request signal by initiating the self-braking. If the brake controller is damaged during the first collision or is isolated from the communications bus, the brake controller can no longer initiate the self-braking. Illustrative embodiments also relate to a control device for carrying out the disclosed method. Finally, Illustrative embodiments also relate to a motor vehicle with the disclosed controller.

BACKGROUND

If a motor vehicle rolls on unbraked after a first collision, a further collision with a further obstacle or a road user can occur. The further collision can be particularly severe as the protective measures for the occupants in the first collision, for example airbags, have already been triggered and are therefore no longer available for protection in the subsequent collision. The triggering of the self-braking following the first collision is also referred to as multi-collision braking.

The multi-collision braking known from the prior art can be provided to use the sensors and controllers for airbags to transmit the request signal for the self-braking by means of the communications bus on detecting the first collision. The request signal is then received by the brake controller of the motor vehicle, which is provided as a rule by an electronic stability program (ESP). The brake controller is also referred to as ESC (Electronic Stability Control). The ESC is thus an integral component of the "multi-collision braking" function. However, if the ESC fails because of the severity of the crash during the first collision and because of the point of impact, the multi-collision braking is not carried out.

Disclosed embodiments provide a motor vehicle with robust multi-collision braking.

BRIEF DESCRIPTION OF THE DRAWINGS

An exemplary embodiment is described below. For this purpose, in the figures.

DETAILED DESCRIPTION OF THE DISCLOSED EMBODIMENTS

Figure 1:
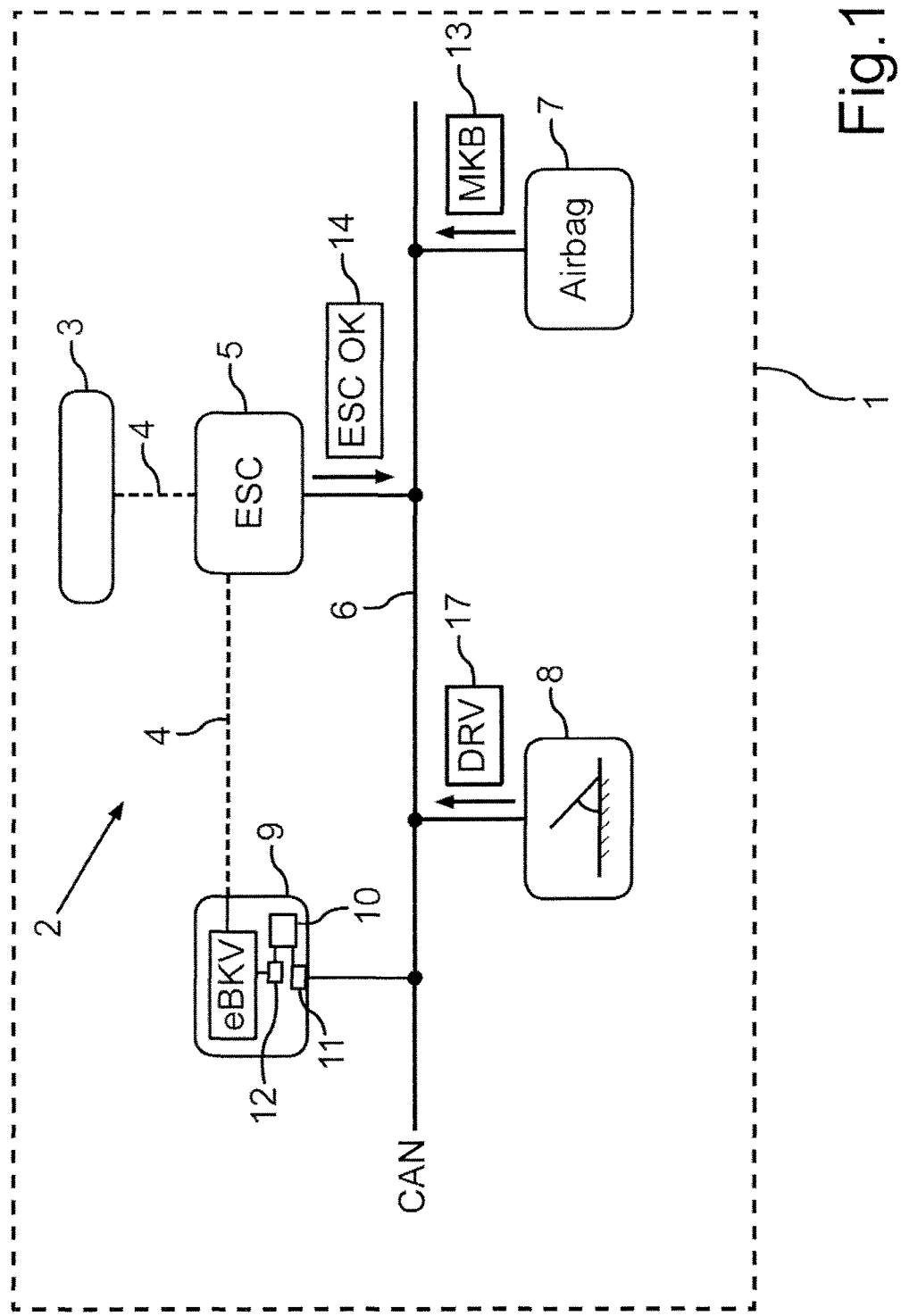
FIG. 1 shows a schematic representation of a disclosed embodiment of the motor vehicle.

Disclosed embodiments provide a method for triggering self-braking in a motor vehicle, in which a request signal for self-braking is transmitted to a brake controller by a collision sensor unit by means of a communications device of the motor vehicle following a first collision during an accident. In other words, the method can be implemented in a motor vehicle known from the prior art, in which a collision sensor system, for example of an airbag, transmits a request signal to an ESC of an electronic stability program. The request signal can for example be transmitted by means of a data bus of the motor vehicle, for example a CAN bus (Controller Area Network), which thus constitutes the communications device. As in the prior art, the brake controller can have the function of initiating the self-braking in response to the request signal, i.e. for example to activate a pump for increasing the braking pressure in the hydraulic brake system.

The disclosed method now provides that the described communications between the collision sensor unit and the brake controller is monitored. For this purpose, the method provides that the request signal is picked up or received by a control device of the motor vehicle. The control device is disposed at a distance from the brake controller, i.e. in a first collision in which the brake controller is struck or damaged, there is a chance that the control device will remain intact. The control device can for example be another controller that is coupled to the communications device, i.e. for example the data bus. The control device determines whether the brake controller responds to the request signal. If no response by the brake controller is detected, i.e. the self-braking is not initiated by the brake controller, the control device itself initiates the self-braking.

The disclosed method provides a further triggering unit, namely the control device, which can initiate the self-braking redundantly for the brake controller in the event of failure or damage to the brake controller. Here the configuration that is known from the prior art, namely the communications between the collision sensor unit on the one hand and the brake controller on the other hand, is not changed. Equally, the control device does not need to intervene in the operation of the brake controller, because the disclosed control device only initiates the self-braking if no response by the brake controller is detected.

Disclosed embodiments also provide a control device for a motor vehicle. The disclosed control device comprises a connecting device for exchanging signals with the communications device of the vehicle. For example, the connecting device can comprise a bus controller, for example for a CAN bus. The control device also comprises a processor that is designed to perform at least one embodiment of the disclosed method. The processor can, for example, be provided by a microcontroller and/or a signal processor.

With the disclosed embodiments, the control device may be designed as an electromechanical brake force booster unit. Accordingly, a development of the disclosed method provides that an electromechanical brake force booster is activated by the control device for initiating the self-braking. An electromechanical brake force booster can for example be provided based on an electric motor, which is arranged to displace a brake cylinder of a hydraulic brake system of the motor vehicle independently of brake pedal operation.

Another disclosed embodiment provides that an electrical machine of an electrical drive device of the motor vehicle is switched into a generator mode or a brake mode by the control device for initiating the self-braking. For example, a torque demand, a so-called generator torque, can be sent to a controller of the electrical machine by the control device. In the generator mode the electrical machine brakes the drive train of the motor vehicle by converting energy of motion into electrical energy. In the brake mode the electrical machine draws additional electrical energy. The brake mode is also referred to as countercurrent braking.

In at least one disclosed embodiment, a brake signal of the brake controller is imitated or emulated by the control device for initiating the self-braking. In other words, with the development it is provided that the control device is coupled to the same actuator devices as the brake controller, i.e. for example to a pump or a plurality of pumps of an electronic stability program. No additional mechanical components are necessary for carrying out the self-braking.

In at least one disclosed embodiment, the following check is carried out to determine whether the brake controller responds to the request signal. After the request signal has been transmitted by means of the communications device, the request signal should be received by the brake controller. The brake controller should thereupon transmit or send back an acknowledgement signal and/or a status message by means of the communications device. A check is now made as to whether the acknowledgement signal and/or the status message is/are transmitted by the brake controller by means of the communications device. If there is no acknowledgement signal and/or status message, then this is assessed or interpreted by the control device to mean that the brake controller is not responding. In the event of there being no acknowledgement signal and/or no status message, the brake controller initiates the self-braking itself. The check results in self-braking in the event of any disruption of the communications, since the active generation of a signal is not necessary. The absence of the acknowledgement signal and/or the status message is checked.

In at least one disclosed embodiment, a trigger signal for multi-collision braking generated by an airbag controller is received as the request signal. Therefore, the airbag sensor can be used for triggering the multi-collision braking.

At least one disclosed embodiment provides that a controller of an electronic stability program, i.e. an ESC, is monitored as the brake controller. As a result, the multi-collision braking known from the prior art can be used as the basis for carrying out the disclosed method.

In at least one disclosed embodiment, the self-braking is initiated by the control device depending on whether an override signal is received within a predefined dead time. The dead time is measured from the reception of the request signal. If an override signal is received, then the control device inhibits the self-braking, i.e. does not initiate it. If an override signal is not received, i.e. there is no override signal, then the self-braking can be initiated by the control device. The dead time can for example lie in a range from 300 milliseconds to 800 milliseconds. When an override signal is provided following the first collision, a driver can perform a driving demand, for example, a steering wheel confirmation or a pedal operation and can thereby control the motor vehicle himself without being hindered in this by the self-braking. The override signal can thus be generated for example depending on a steering operation and/or a pedal operation. Suitable detecting devices for this are available in the prior art.

In at least one disclosed embodiment, by contrast an accelerator pedal demand is ignored during and/or after the initiation of the self-braking. Therefore, the driver cannot, for example, switch an electrical machine into the motor mode by operating an accelerator pedal, i.e. cannot produce a drive torque, while at the same time the control device is controlling the same electrical machine for example in the generator mode. A pedal demand can be signaled by sensing a pedal operation. If the control device also responds to an override signal in the described manner, then of course the accelerator pedal demand can no longer be assessed as an override signal from the initiation of the self-braking.

In at least one disclosed embodiment, during the self-braking a braking torque is adjusted by the control device depending on a steering operation and/or a pedal operation. The detection of a steering operation and/or a pedal operation is known from the prior art. The adjustment of the braking torque during the self-braking allows the driver to still carry out a change of steering angle and/or a change of pressure on the pedals and can therefore adjust the braking torque such that the driving stability of the motor vehicle is maintained. The adjustment of the braking torque can for example be carried out by adjusting the demanded generator torque for an electrical machine. With a brake force booster, the braking torque can be adjusted using the electromechanically generated brake force.

As already mentioned, it is in particular provided that the request signal is received from a data bus, in particular a CAN bus. This allows the request signal and/or an acknowledgement signal and/or a status message to be transmitted in predetermined transmission cycles, so that specific corresponding transmission time points at which a corresponding signal is to be expected can be monitored. If the respective signal is not present, there is confidence that the signal is not present on the data bus.

As already mentioned, disclosed embodiments also include a motor vehicle. The disclosed motor vehicle comprises the brake controller for initiating self-braking depending on the request signal and a collision sensor unit. The collision sensor unit is arranged to transmit the request signal to the brake controller by means of a communications device of the motor vehicle, for example the described data bus, following a first collision during an accident. This is the arrangement for implementing multi-collision braking that is known from the prior art. With the disclosed motor vehicle, it is now additionally provided that at least one disclosed embodiment of the disclosed control device is connected to the communications device. In other words, with the disclosed motor vehicle the communications between the collision sensor unit and the brake controller is monitored by the control device and the self-braking is initiated by the control device in the absence of a response by the brake controller.

With the disclosed motor vehicle, the collision sensor unit may be provided by an airbag device of the motor vehicle, so that the sensor or the sensors of the airbag device can be used as a collision sensor system and an airbag controller is available for producing the request signal.

The disclosed motor vehicle is, in particular, a powered vehicle that is embodied as a truck or automobile or minibus, for example.

Components of the disclosed embodiments are individual features that are to be considered independently of each other, each of which also develops the disclosed embodiments further independently of each other and that are thus also to be considered as components of the disclosed embodiments individually or in a different combination than the indicated combination. Furthermore, the disclosed embodiments can also be supplemented by another of the already described embodiments.

In the figures, functionally equivalent elements are each provided with the same reference characters.

FIG. 1 shows a motor vehicle 1 that can be a powered vehicle, in particular an automobile, truck or minibus for example. The motor vehicle 1 can comprise a hydraulic brake system 2, of which wheel brakes 3 and hydraulic brake pressure lines 4 are illustrated in FIG. 1. A braking pressure in the brake pressure lines 4 can be adjusted by an electronic stability program 5, of which a brake controller ESC is illustrated in FIG. 1. The brake controller ESC can be connected to a communications device 6 of the motor vehicle 1. The communications device 6 can be a data bus, for example a CAN bus. An airbag device 7 and a pedal position detector 8 can also be connected to the communications device 6. The pedal position detector 8 can be arranged to detect respective pedal positions of (not shown) pedals of a set of pedals of the motor vehicle 1, in particular of a brake pedal and/or of an accelerator pedal.

Furthermore, a control device 9 that can comprise an electromechanical brake force booster eBKV can be connected to the communications device 6. The control device can also comprise a processor 10 that can be connected by means of a connecting device 11 to the communications device 6 and that can control a control device 12 for controlling the electromechanical brake force booster eBKV. The control device 12 can for example comprise an inverter for controlling an electric motor of the electromechanical brake force booster eBKV.

The electromechanical brake force booster eBKV can also operate the wheel brakes 3 by means of the brake pressure lines 4.

With the motor vehicle 1, a multi-collision brake function can be provided by producing a request signal 13 for multi-collision braking on detecting a first collision by the airbag device 7 and transmitting the request signal by means of the communications device 6 in the motor vehicle 1. The electronic stability program 5 can be configured such that its brake controller ESC receives the request signal 13 and activates the wheel brakes 3 in a known manner depending on the request signal 13, i.e. the electronic stability program brakes the motor vehicle 1. Self-braking is performed thereby.

If the brake controller ESC is operational and can activate the wheel brakes 3 itself, this can be communicated by the brake controller ESC by transmitting an acknowledgement signal and/or a status message 14 by means of the communications device 6.

However, if the brake controller ESC is damaged or is otherwise rendered inoperable or is isolated from the communications device 6 during the collision, the request signal 13 cannot be processed by the brake controller ESC.

In the motor vehicle 1, failure of the multi-collision braking in this case is prevented in the following way. For this refer again to the method shown in FIG. 2, which can be performed by the processor 10 of the control device 9.

A check can be made in a step S1 as to whether the request signal 13 is transmitted by means of the communications device 6.

Figure 2:
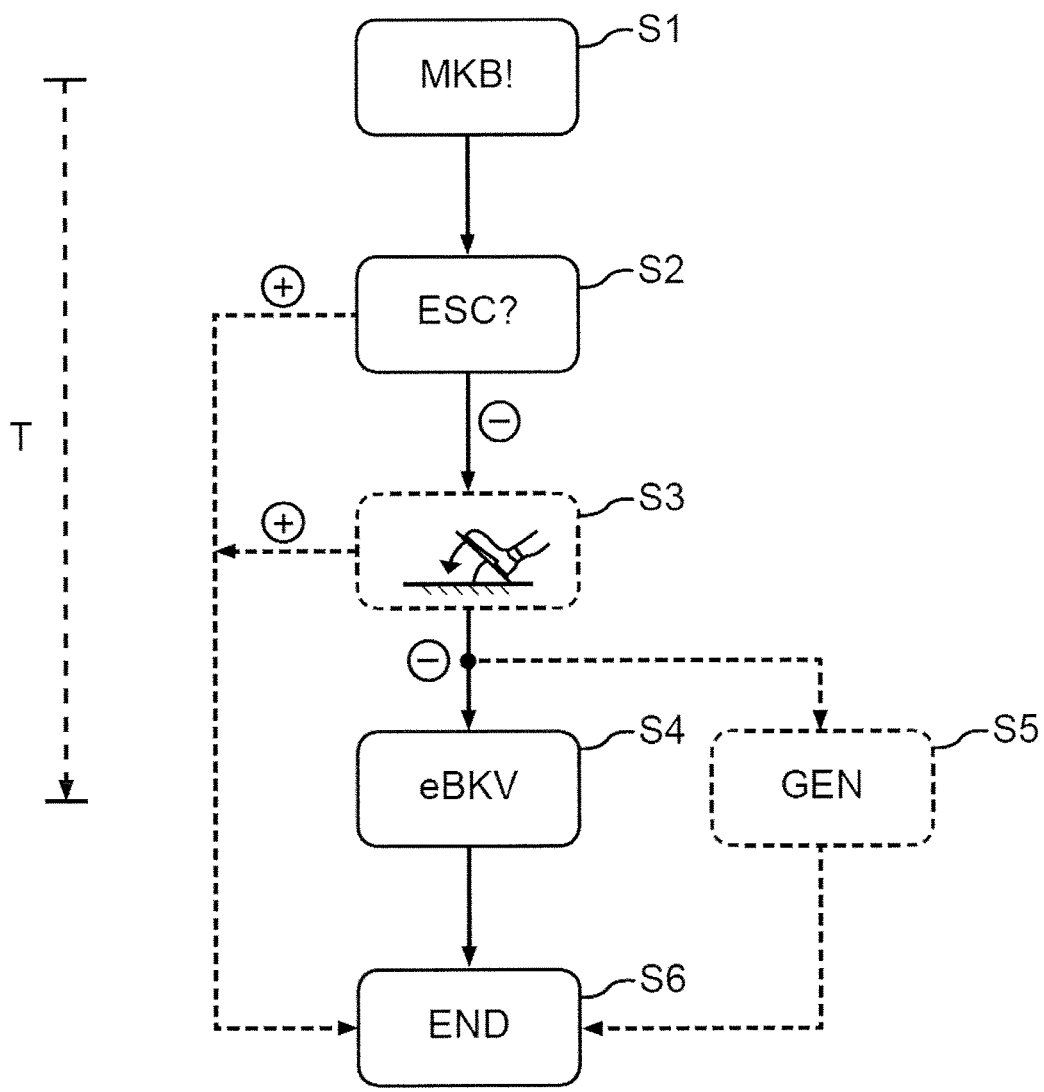
FIG. 2 shows a flow chart diagram for illustrating a process of a disclosed embodiment of the disclosed method as it can be performed in the motor vehicle of FIG. 1.

Subsequently, in a step S2 the processor 10 can monitor whether the status message 14 is transmitted by the brake controller ESC by means of the communications device 6. If the status message 14 is not detected by the processor 10 within a predefined maximum wait time, it can be provided that the control device 10 initiates the self-braking. In FIG. 2 the absence of the status message 14 is symbolized by a minus sign "−". If the brake controller ESC is intact, the status message 14 is transmitted and the self-braking is initiated by the brake controller ESC. This is symbolized in FIG. 2 by a plus sign "+". In this case the process can be aborted or terminated by the processor 10 in a step S6.

If the brake controller ESC does not transmit the status message 14, a check can be made in an optional step S3 as to whether the pedal operation detection means 8 is signaling a drive demand 17, i.e. whether the driver is operating the set of pedals and/or the steering wheel to drive the motor vehicle 1 himself (DRV drive, driving). If the drive demand 17 is present, it can be provided to jump to step S6 and thus to terminate the process.

If there is no drive demand, the electromechanical brake force booster eBKV can be activated in a step S4 by the processor 10 by means of the control device 12 for example. The self-braking is initiated thereby. The electromechanical brake force booster eBKV can thereupon produce a braking pressure in the brake lines 4, by means of which the wheel brakes 3 are activated and as a result the motor vehicle 1 is braked. The motor vehicle may be braked to a standstill.

Additionally or alternatively, in a step S5 it can be provided that a (not shown) electrical drive device of the motor vehicle 1, which can be provided as a traction drive of the motor vehicle 1, is switched into a generator mode GEN by the processor 10 for example, so that as a result the drive train is subjected to a braking torque. For example, a generator torque can be obtained from an inverter for the electrical drive and a controller that is controlling the inverter. This also initiates self-braking.

Furthermore, it can be provided that the initiation of the self-braking by the processor 10 is delayed in the step S1 by a dead time T after reception of the request signal to give the driver the option following the first collision to take over control of the motor vehicle 1 himself, i.e. for example to produce the described drive demand 17.

After carrying out the self-braking, the process can be terminated in the step S6.

In particular, it is thus provided that in the case of an accident with a primary crash, in the event of a request for multi-collision braking by the crash sensor system braking of the vehicle by means of the electromechanical brake force booster eBKV is carried out to provide redundancy. The electromechanical brake force booster eBKV as well as the brake controller ESC of the electronic stability program are networked by means of a data bus system with the rest of the vehicle and the controller of the crash sensor system, so that the request for multi-collision braking can emanate from the controller and can be transmitted to both the brake controller ESC and also to the electromechanical brake force booster eBKV. By exchanging the status signal, i.e. the status message 14, the fallback mode is activated by assuming a non-responsive brake controller ESC in the absence of the status message 14.

In the event of crashes in which the brake controller ESC is no longer available but the brake hydraulics are intact, the performance of the multi-collision braking can be carried out by means of the electromechanical brake force booster eBKV. The electromechanical brake force booster eBKV brakes the vehicle to a standstill.

In addition, in electric vehicles and hybrid vehicles there is the option of using the electrical machine of the drive device as a generator for braking the motor vehicle independently of the brake hydraulics. In this case the electromechanical brake force booster eBKV may make a torque demand, the generator torque, on the drive train. Here the prerequisite should be met that the electric motor of the drive unit is not in the propulsion mode, i.e. the accelerator pedal is not being operated. This can be checked in the manner described in step S3. Alternatively, the accelerator pedal value can be ignored over a defined time period.

During the generator deceleration, the limits of the deceleration are predefined by the characteristic field of the electric motor.

The implementation or performance of the multi-collision braking is not exclusively carried out by means of the brake controller ESC, but by means of the electromechanical brake force booster eBKV in a fallback mode. In addition, besides the deceleration with the hydraulic friction brake, in electric and hybrid vehicles there is the option that a generator torque is demanded from the drive train by means of the electromechanical brake force booster for deceleration.

To be able to make use of already available implementations of multi-collision braking without change, in the event of a request for multi-collision braking the brake controller ESC may be initially active as the master. If the ESC not available, to provide redundancy the electromechanical activation of the wheel brakes by means of the electromechanical brake force booster as a slave is of benefit. The handover from the master controller to the slave controller is carried out by the ESC sending a status signal to the data bus. The signal is analyzed in the controller of the electromechanical brake force booster, i.e. by the processor 10 of the control device 9. In the absence of the ESC signal, the fallback mode is activated.

As a result, the range of actions of the electromechanical brake force booster may be extended. In addition, a more robust field performance is a result of the described redundancy. There are thus more options for effectively avoiding a second collision during an accident. The electromechanical brake force booster is more responsive, which results in shorter braking distances.

Overall, the example shows how the use of electromechanical braking can be implemented by the disclosed embodiments to provide redundancy.

A method of controlling a braking assistance system is known from EP 2 423 060 A1, with which a sensor signal that signals a collision is transmitted on two physically independent transmission paths to the brake controller. If one of the two connections is damaged during a collision, the collision can always still be signaled to the brake controller by means of the remaining connection. In the event of failure of the brake controller because of damage during the first collision, the multi-collision braking can fail here too.

The invention claimed is:

1. A method for triggering self-braking in a transportation vehicle, the method comprising:
    sensing of a first collision during an accident by a collision sensor unit of the transportation vehicle;
    in the transportation vehicle, transmitting a self braking request signal from the collision sensor unit to a brake controller and a control device using a communications device of the transportation vehicle in response to the sensing of the first collision during the accident;
    receiving the self braking request signal by the control device of the transportation vehicle, which is located within the transportation vehicle but remote from the brake controller;
    monitoring, by the control device, communications between the collision sensor unit and the brake controller;
    determining, by the control device, whether the brake controller responds to the self-braking request signal based on the monitored communications between the collision sensor unit and the brake controller; and
    initiating self-braking for the transportation vehicle by the control device in response to a determination that the brake controller has not responded to the self-braking request signal.

2. The method of claim 1, further comprising activating an electromechanical brake force booster by the control device to initiate the self-braking in response to the brake controller not responding to the request signal.

3. The method of claim 1, further comprising the control device switching an electrical machine of an electrical drive of the transportation vehicle into a generator mode or a brake mode to initiate the self-braking.

4. The method of claim 1, further comprising the control device imitating a brake signal of the brake controller to initiate the self-braking.

5. The method of claim 1, wherein determination of whether the brake controller responds to the self-braking request signal includes the control device checking whether an acknowledgement signal and/or a status message is/are transmitted by the brake controller via the communications device to the collision sensor unit.

6. The method of claim 1, wherein the self-braking request signal is a trigger signal for multi-collision braking produced by an airbag controller included in an airbag device installed in the transportation vehicle.

7. The method of claim 1, wherein brake controller is a controller of an electronic stability program.

8. The method of claim 1, wherein initiation of the self-braking by the control device is performed also depending on whether an override signal is received within a predefined dead time measured from reception of the self-braking request signal by the brake controller.

9. The method of claim 1, wherein reception of an accelerator pedal demand is ignored by the control device during and/or after the initiation of the self-braking.

10. The method of claim 1, further comprising adjusting a braking torque by the control device during the self-braking depending on a steering operation and/or a pedal operation.

11. The method of claim 1, wherein the communications device is a data bus and the self-braking request signal is received from the data bus as the communications device.

12. A control device for triggering self-baking in a transportation vehicle in response to detection of a first collision during an accident by a collision sensor unit of the transportation vehicle, the control device comprising:
    a connecting device for exchanging signals with a communications device of the transportation vehicle;
    a processor that performs a method for triggering self-braking in the transportation vehicle, wherein the method includes transmitting, in the transportation vehicle, a self-braking request signal from the collision sensor unit of the transportation vehicle to the control device and a brake controller of the transportation vehicle, wherein the self-braking request signal is transmitted via the communications device of the transportation vehicle in response to the detection of the first collision during the accident,
    wherein the self-braking request signal is received by the control device of the transportation vehicle, wherein the control device is boated within the transportation vehicle but remote from the brake controller, and
    wherein the method further comprises monitoring, by the control device, communications between the collision sensor unit and the brake controller, determining whether the brake controller responds to the request signal based on the monitored communications between the collision sensor unit and the brake controller and initiating self-braking by the control device in response to no response by the brake controller being detected.

13. The control device of claim 12, wherein the control device is an electromechanical brake force booster unit.

14. A transportation vehicle comprising:
a brake controller for initiating self-braking in response to receipt of a self-braking request signal;
a collision sensor unit that transmits the self-braking request signal to the brake controller and a control device using a communications device of the transportation vehicle following detection, by the collision sensor unit, of a first collision during an accident; and
the controller device connected to the communications device, wherein the control device includes a processor that performs a method for triggering self-braking in the transportation vehicle, wherein the method includes transmitting, in the transportation vehicle, a self-braking request signal from the collision sensor unit of the transportation vehicle to the control device and the brake controller of the transportation vehicle, wherein the self-braking request signal is transmitted via the communications device of the motor vehicle in response to the detection of the first collision during the accident, wherein the self-braking request signal is received by the control device of the transportation vehicle, wherein the control device is located within the transportation vehicle but remote from the brake controller, and wherein the method further comprises monitoring, by the control device, communications between the collision sensor unit and the brake controller, determining whether the brake controller responds to the request signal based on the monitored communications between the collision sensor unit and the brake controller and initiating self-braking by the control device in response to no response by the brake controller being detected.

15. The motor vehicle of claim 14, wherein the collision sensor unit is an airbag device of the transportation vehicle, wherein an airbag controller of the airbag device produces the self-braking request signal.

\* \* \* \* \*